Nov. 4, 1969   R. I. MARKEY   3,476,010
FIXED SCREW JOINT SYSTEM
Filed Sept. 26, 1967

Roscoe L. Markey   INVENTOR

United States Patent Office 3,476,010
Patented Nov. 4, 1969

---

3,476,010
FIXED SCREW JOINT SYSTEM
Roscoe I. Markey, Charlottesville, Va., assignor to Teledyne, Inc., Hawthorne, Calif., a corporation of Delaware
Filed Sept. 26, 1967, Ser. No. 675,740
Int. Cl. F16b *31/02*
U.S. Cl. 85—62                                    1 Claim

ABSTRACT OF THE DISCLOSURE

A fatigue life increasing and load indicating device for threaded fasteners including a fastener having a dished collar captively mounted in a reduced neck portion thereon, wherein the collar and the neck portion are formed with radiused mating surfaces.

---

This invention relates to fastening devices generally and particularly to improved nuts, bolts, screws, and washers.

In prior practice there has been no way in which the critical stresses or compression of a washer could be determined readily except, perhaps, by means of a torque-indicating device and this involves friction. Therefore it is an object of my invention to provide washers which will indicate the loading directly.

Another object is to provide a resilient washer which will be compressed under load and will simultaneously indicate the magnitude of the loading.

An additional object is to provide a self-retaining, thread-loading and stress-balanced nut to prevent local high combined stresses on the shank of a screw or bolt at the root of the thread. The stresses are balanced to eliminate all low-stressed metal and to have all metal stresses within a safe working limit.

A further object is to provide a novel collar for providing continuous axial loading and eliminating bending stresses in the shank.

A combined, relatively rotatable nut and washer to apply continuous elastic axial loading.

Another object is to provide a bolt or screw having a recess of square cross section in the head to permit some angular movement of the driver with no reaming of the recess.

Other objects will be evident in the following description.

In this specification the words "screw" and "bolt" will be used interchangeably since the described improvements can be applied to both bolts and screws.

Figure 1:
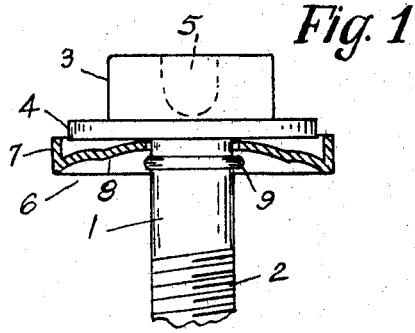
FIGURE 1 is a part sectional elevation of a bolt or screw with an attached load-indicating washer under no axial load.

In FIGURE 1, the screw has reduced diameter body 1, large head fillet 1a, raised threads 2, and head 3, with circular flange 4, and square recess 5 which may be of any suitable cross section for receiving a tool for turning the bolt or screw. Washer 6 has up-turned rim 7 extending from inner portion 8 which has a double curvature as shown. This type of construction provides three ranges of the load compression of the washer. First, the inner edge is depressed and then the "hump" comes into play to furnish a further yielding resistance to the screw head movement. Circular rib 9 is formed in the screw shank just large enough to prevent washer 6 from slipping off the screw.

An outstanding feature of this device or combination is that the washer rim 7 acts as a reference or gauge to indicate the degree of tightness or the stress to which the screw is subjected. It will be seen that as the screw is tightened, the flange 4 will be moved into the washer space adjacent rim 7 and the stress in the screw can be approximated by observing the extent of axial displacement of the flange relative to the edge of rim 7. The flange 4 can be provided with a scale of pounds force if desired. In that case the washer 6 should be of calibrated or known strength and resiliency.

Figure 2:
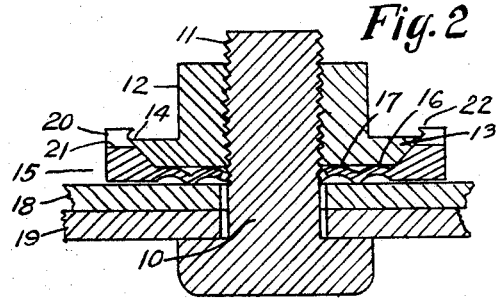
FIGURE 2 is a part sectional elevation of a combined nut and load-indicating washer at full axial load.

In FIGURE 2, bolt 10 has threads 11 on which nut 12 is screwed. Nut 12 has flange 13 with a tapered rim leading to circumferential edge 14. Washer 15 has circular humps or ridges 16 and 17 which are engaged by the adjacent surface of the nut when it is tightened to clamp plate 18 to plate or other object 19. The washer is crenelated, forming slots 20 through which the position of edge 14 relative to slot surfaces 21 can be observed. The round flange has formed inner tips 22 which extend inward sufficiently to prevent the washers from separating from the nuts, when not attached to a bolt. Since the portion 13 has an inclined or tapered edge surface the nut can be forced over the tips 22 since the metal or other material will yield slightly.

Figure 3:
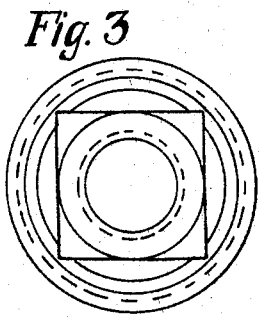
FIGURE 3 is a top plan view of another combined nut and load-indicating and carrying collar.
Figure 4:
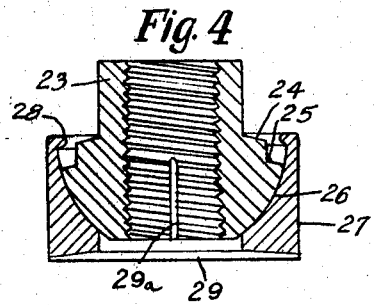
FIGURE 4 is a sectional elevation of the device of FIGURE 3.

In FIGURES 3 and 4, nut 23 is of square or hexagonal shape and has circular shoulder 24 and another circular shoulder or step 25. The portion 26 is spherical to fit the interior of elastic collar 27 which has circular, inwardly projecting lip 28 which prevents separation of the collar from the nut. The lower portion of the collar is dished to form an arch-like construction, leaving space 29 for flexing of the collar. This combination nut and collar has the advantages of a square nut, a large contact area between the nut and collar, and combined axial and radial forces acting yieldingly to flex the collar. Split or cut 29a may be provided.

My improved nut eliminates various undesirable characteristics of prior nuts and provides, among others, the following advantages:

(1) Distribution of the load on the threads prevents seizure. With the nut split on one side at the bottom, or clear through in some sizes, the pitch diameter expands at the bottom (where the threads are loaded the heaviest in a standard nut). This small expansion will release some of the load on the bottom threads and shift it to the upper threads. The mean vector, of the force from the spherical surface in the collar, to the nut element intersects the axis at about the middle of the vertical height of the threads. This will distribute the load to all of the threads in the nut element. This distribution prevents high local bearing loads, found in standard nuts, which high loads precipitate molecular adhesion and seizure. Torque applied after seizure either shears the threads or the bolt/screw shank at the root of the male thread. The shear may take place in the unthreaded section when it is a necked bolt (smaller than the root diameter). This type of failure is usually called a shear failure, while the fact is, high bearing pressure that failed to slide was the primary failure and shear was the secondary failure. The secondary failure would not have occurred if the primary failure had been prevented.

(2) Thread shear strength is increased. The radial force, from axial load and thread angle which tend to expand the nut element, is less than the inward radial force exerted by the collar. Thus the nut element is pressed tightly against the external threads resulting in more thread overlap than is found in standard nuts. This increased overlap increases the thickness of the threads at the shearing circle. This increased area increases the shearing strength of the threads. The radial compressive force on the threads will delay the movement of the thread sector separated by the shearing action. This will increase the load required to complete a shear action. Thus the shear strength is increased two ways.

(3) Elastic axial loading provides continuous torque gripping. The axial load expands the collar. As the collar expands, the nut element sinks into the collar. As the load is reduced, the elasticity of the collar shrinks its diameter and squeezes the nut element out and away from the collar face. This means that as the clamped material shrinks and expands, the elasticity of the collar maintains an axial load on the nut element and the bolt/screw. Thus there is a continuous clamping force in service. While the tension in the collar is providing a continuous axial load, it is also providing a continuous radial torsional gripping force on the bolt/screw threads. This gripping force resists any relative torsional movement between the nut element and the shank of the bolt/screw. Thus the nut element will not back off from any vibration.

A fixed joint has lost its basic purpose when the axial load reaches zero, even when the nut does not fall off. A joint between two members is not fixed without continuous clamping force or a drive fit of the shank in the hole. The nuts and bolts/screws provide the continuous clamping force.

(4) There is no bending stress at the bolt/screw thread root, resulting from manufacturing tolerances introducing misalignment between the nut face and the clamped surface. This misalignment greatly weakens most joints made with standard hardware. This weakness cannot exist with the improved nuts, and bolts/screws when the misalignment is less than 10°. This is shown by the drawing.

(5) The load is distributed away from the hole in the clamped material.

Figure 5:
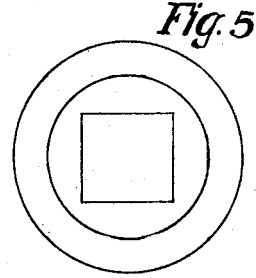
FIGURE 5 is a top plan view of a combined collar or washer and bolt or screw having a square recess in the head.
Figure 6:
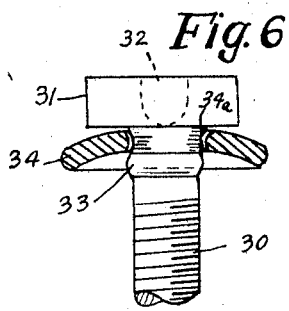
FIGURE 6 is a part sectional elevation of the device of FIGURE 5.

In FIGURES 5 and 6, screw or bolt 30 has head 31 with a square recess 32 or some other suitable shape to receive a screw driver or wrench for turning the screw. Circumferential rib 33 is formed around the screw shank, just large enough to keep the collar from dropping off after it is forced over rib 33.

The collar 34 can align itself between the large fillet 34a and the clamped surface, at an angle from a plane normal to the shank axis, without introducing bending stress in the shank. This elastic collar not only avoids bending stress in the shank, but it maintains continuous force on the clamped surface. This elastic load not only maintains a fixed joint, but it augments the axial elasticity of the shank. Thus, when the joint is subjected to a wide range of temperature, the joint is held fixed and at the same time, the joint is not overstressed to failure when the clamped material expands more than the bolt/screw shank. The elastic collar will increase the load in proportion to its deflection but that increase will be far less than that resulting from stretching the shank an amount equal to the deflection of the collar. This is especially true when the distance from the face of the head to the face of the nut, or the thickness of the clamped material, is very short. This elastic collar is very useful in preventing the overstressing of short screws/bolts and maintaining a fixed joint with very long bolts/screws, subjected to wide temperature ranges.

The load which can be carried by the collar will of course, increase with increased collar thickness. This collar will support the full axial load within the elastic limit of the material. It has an important advantage in that it applies the clamping load near the periphery rather than near the central hole, thus avoiding radial fractures. It can be arranged to retain a sealing collar and it protects the clamped surface from driving sockets or the like. It can be used at the head end or at the nut end.

Figures 7, 8:
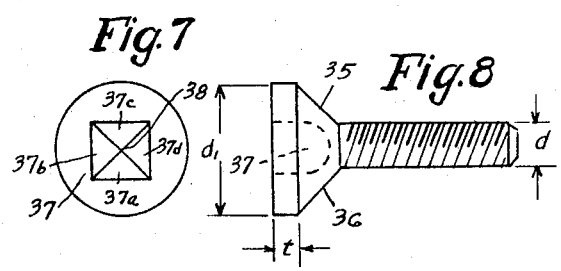
FIGURE 7 is a top plan view of a screw head with large head-shank fillets and four curved bottom surfaces of a recess.
FIGURE 8 is a side elevation of a screw having a head with a recess having curved bottom surfaces similar to those of FIGURE 7.

The driving recesses shown in FIGURES 7 and 8 have spherically rounded bottoms so that the driving tool can be out of alignment and still will be effective in turning the screw. In FIGURE 8, the angle between lines 35 and 36, representing the intersections with the fillet of a plane lying in the axis, is 90 degrees. The diameter $d$, is 1.9 times the diameter of the shank $d$, and the thickness of the head $t$ is 0.1 $d$. These proportions provide an exceptionally strong screw. The square recess 37 in the head has a combination bottom surface comprising four curved surfaces $37_a$, $37_b$, $37_c$, and $37_d$ meeting at a point 38. These surfaces are preferably cylindrically curved.

Figure 9:
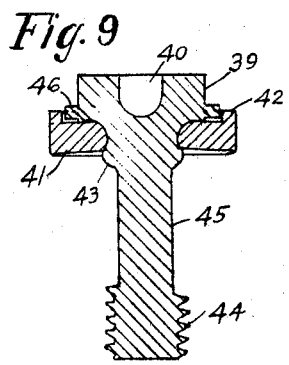
FIGURE 9 is a sectional view of a screw with attached collar or washer, the screw having a special shank and thread.

In FIGURE 9 the screw has head 39 with recess 40 which may be of square cross section as in FIG. 7 or of other configuration. Dished collar or washer 41 having indicating rim 42 is attached to the screw, preferably by forcing the collar over circular ridge 43. The collar could be compressed after placing it in the position shown or ridge 43 could be formed after placing the collar. The degree of compression of dished collar 41 can be observed by means of the relative axial position of head 39 relative to rim 42. Flange or shoulder 46 extends from the head and its axial position may be observed relative to rim 42.

Threads 44 are preferably rounded on thin outer edges and have fillets joining the bases or inmost or root diameters at the thread junctions. It is important that the diameter of the shank 45 be less than the root diameter of the threads, in order to distribute the stresses properly. Another important feature of my invention is that the slope or angle of the loaded side of the threads should be less than the unloaded angle. I prefer an angle of approximately 10 degrees for the loaded side and around 44 degrees for the unloaded side although the invention is not limited to these angles. The angle is measured with respect to a plane at right angles to the axis of the screw.

What I claim is:

1. A fatigue life increasing and load indicating device comprising a threaded fastener having an enlarged head portion with driving means thereon and a reduced neck portion extending axially from one end thereof, said neck portion defining an annular, radiused concave surface in the form of a fillet, and a continuous annular collar formed of resilient material mounted on said neck portion with the inner periphery of said collar defining a convex radiused surface complementary to and in peripheral engagement with the concave surface of said neck portion, the respective radii of said engaging surfaces being substantially equal, said collar being dished at the end thereof remote from said enlarged head to define a generally frusto-conical configuration, said neck portion having protrusion means adjacent said collar to retain said collar thereon, the axial dimension from said protrusion means to the bearing surface of said enlarged head being generally equal to the axial thickness of said collar.

References Cited

UNITED STATES PATENTS

| | | | |
|---|---|---|---|
| 2,713,883 | 7/1955 | Poupitch | 151—37 |
| 1,896,650 | 2/1933 | Trotter | 151—35 |
| 1,952,600 | 3/1934 | McComb | 151—38 |
| 2,056,112 | 9/1936 | Protin | 85—46 |
| 2,977,838 | 4/1961 | Oestereicher | 85—45 |
| 3,135,154 | 6/1964 | Zenzic | 85—62 |
| 3,181,413 | 5/1965 | Wing | 151—38 |
| 3,283,638 | 11/1966 | Ansingh | 85—45 |

FOREIGN PATENTS

| | | |
|---|---|---|
| 721,806 | 12/1931 | France. |
| 990,764 | 6/1951 | France. |
| 870,946 | 6/1961 | Great Britain. |

RAMON S. BRITTS, Primary Examiner

U.S. Cl. X.R.

151—38